Sept. 3, 1929.  H. KARL  1,726,838
ELECTROPNEUMATIC BRAKING SYSTEM
Filed Oct. 9, 1928
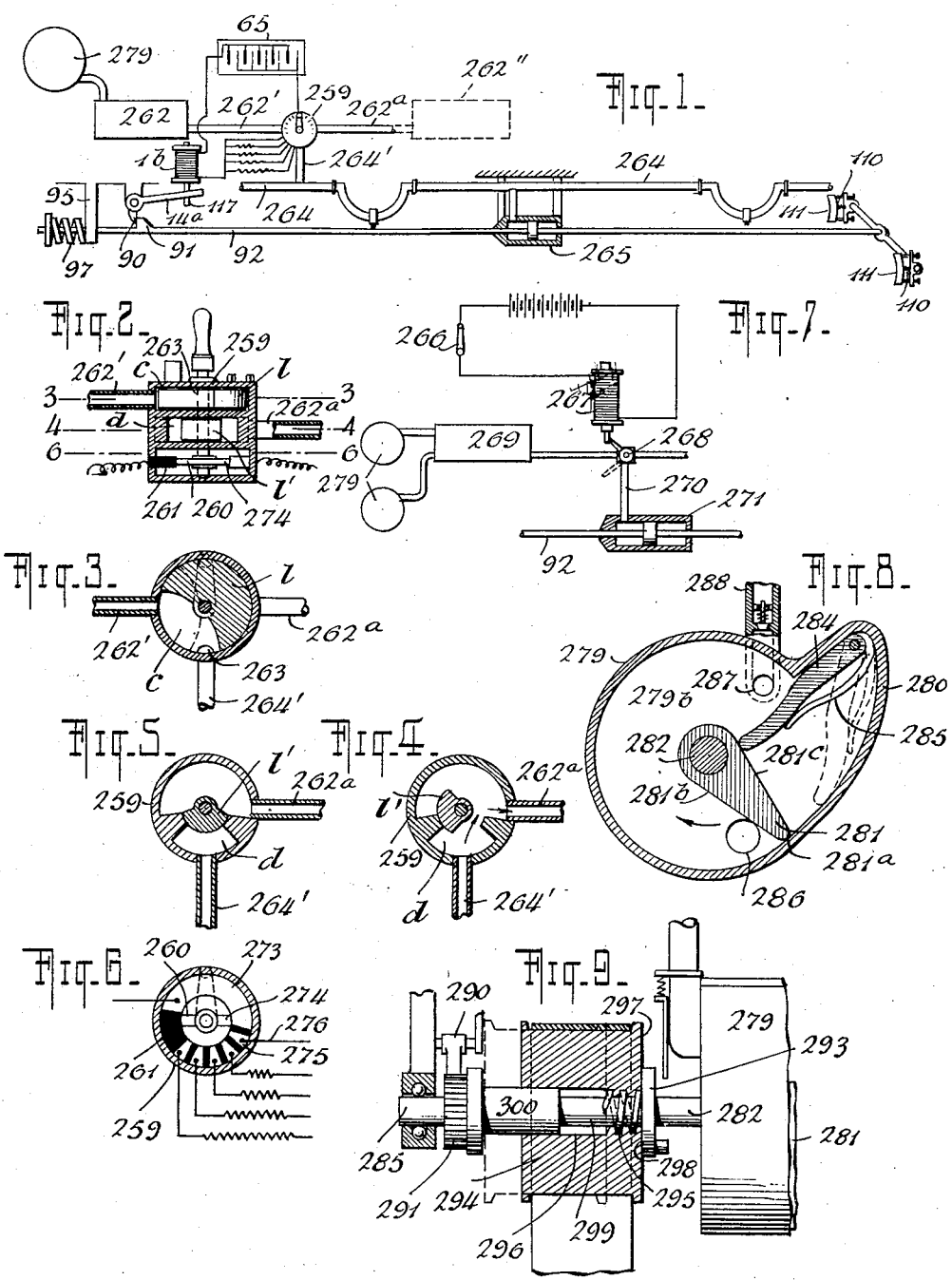

Patented Sept. 3, 1929.

1,726,838

UNITED STATES PATENT OFFICE.

HEINRICH KARL, OF JERSEY CITY, NEW JERSEY.

ELECTROPNEUMATIC BRAKING SYSTEM.

Application filed October 9, 1928, Serial No. 311,347, and in Germany September 5, 1927.

My invention relates to electrically and pneumatically controlled brakes for vehicles, more particularly for vehicles adapted to travel on tracks, such as trains, and is an improvement over the electrically controlled braking systems disclosed in my United States Patent No. 1,649,597, issued November 15, 1927. In this patent there are shown a number of braking devices wherein mechanical means, in the form of a strong spring, is employed to apply the brakes upon failure, by accident or design, of the electric current, the latter operating through various electromagnetic devices, such as a solenoid or motor, to hold the brake-shoes out of contact with the wheels of the vehicle against the action of said spring during the normal travel of the vehicle, the degree of braking effect being controlled by the strength of the current which is fed to the electromagnetic device, electric energy is therefore constantly expended during the inoperative position of braking systems constructed in accordance with this patent.

It is an object of the present invention to provide means whereby the amount of electric energy required for the operation and control of the electric brakes described in the above-mentioned patent is reduced to a minimum. I accomplish this purpose by providing mechanism in association with the electric brake control device and operated pneumatically to maintain the brakes in inoperative position during the travel of the locomotive.

It is a further object of the invention to provide an auxiliary pneumatically operated mechanism of the type indicated which is simple in construction, can be readily associated with existing electrically controlled braking systems, and is positive, reliable and economical in operation.

In the accompanying drawing, which illustrates by way of example, two forms of my invention without defining its limits, Figure 1 illustrates diagrammatically a combined electrically and pneumatically operated braking system wherein pneumatically controlled means are employed to maintain the brakes in inoperative position; Figure 2 is a longitudinal section through the switch controlling such braking system; Figure 3 is a section along the line 3—3 of Figure 2; Figures 4 and 5 are sections along the line 4—4 of Figure 2 showing the switch in different positions; Figure 6 is a section taken on the line 6—6 of Figure 2; Figure 7 is a modification of the arrangement shown in Figure 1; Figure 8 is a section through the air-compressor; and Figure 9 is a side view of the same together with its drive, partly in section.

Referring to the drawing, wherein my invention is shown applied, by way of example, to an electrically controlled braking system for a train, there is shown an air-line or pipe 264 extending throughout the length of the train, as is common with pneumatic braking systems. An air-cylinder 265 is connected to the air-line 264, the piston being connected by means of a suitable rod, as by the brake rod 92 shown in Figure 3 of my above-mentioned Patent No. 1,649,597, with brake-shoes 111 having weak springs 110, the purpose of which is set forth in said patent. The air-line 264 is connected to an air storage tank 262 through conduits 264' and 262' controlled by a valve 259. The electrical and mechanical equipment indicated by the numerals $1^b$, 65, 117, $14^a$, 90, 91, 95 and 97 at the left of Figure 1 is all found in said patent and reference is made thereto for a detailed description.

It being an object of the present invention to reduce, by means of compressed air, the amount of electric current required to operate electrically controlled brakes, the actual braking effect being controlled electrically whereby a rapid and uniform braking of all the cars of the train is obtained, my improved electropneumatic braking system is so constructed and controlled that compressed air is admitted into the cylinder 265 only when the brakes are to be set into inoperative position, the exciting circuit of the electric motor 118 or magnets 1 or 86 shown in said patent being at the same time broken. To this end, the air-valve 259 is constructed as a unit together with a switch which corresponds to the switches 50', 50'' or 50''' of said patent, the switch arm 260 of such switch upon release of the brakes contacting with an insulating bar 261.

The valve 259 is provided with two chambers $c$ and $d$ in which rotary valve members $l$ and $l'$ are located, said members being connected through an opening 263. The conduit 262' opens into the chamber $c$, while to the chamber $d$ there are connected the conduit 264' and also a conduit $262^a$ opening into the atmosphere or into a collector 262''. In the released position of the brakes the valve members *l* and *l'* take the positions shown in Figures 3 and 5 wherein compressed air from the container or tank 262 is conducted through chamber *c*, opening 263, chamber *d* and conduits 264' 264 into the cylinder 265. At the same time the switch arm 260 takes the position shown in Figure 6, so that the exciting current for the electromagnetic devices is interrupted.

If the brakes are to be held in released position only by means of the electric current, the switch arm 260 remains in contact with the contact element 273 while the opposite arm 274 (Figure 6) is in contact with the terminal 275 and throws in the full current over wire 276.

When the switch arm 274 lies upon one of the contacts of the switch, i. e. when the electric motors or magnets are partly or fully excited, depending on the resistances in the wires leading from said contacts to said motors or magnets (see Figure 6), the opening 263 is closed by the valve element *l* and the conduit 264' is connected by the rotary element *l'* with the conduit 262ª, so that the compressed air exhausts from the cylinder 265, (Figure 4).

In Figure 7 a modification of the invention is disclosed, which is mainly adapted for trains or other vehicles which are not provided with a through air-line. In this form of the invention the admission and exhaust of compressed air in each car is controlled by electromagnetic valves which are operated from a common switch 266 located in the engineer's cab. If this switch is closed, the electromagnets 267 of the train are excited by a current which may be comparatively weak, the armatures of said electromagnets being connected to the rotary valves to rotate the same so as to feed air from the storage tank 269 through conduit 270 into the cylinder 271 of each car or coach.

The compressed air may be generated by one or more rotary pumps or compressors 279 (Figure 8) which are driven from a rotating part of the train or car, for example from an axle. The pump housing consists of a cylindrical or drum-shaped section 279 having an enlargement 280. In the cylindrical section 279 the valve 281 is mounted on a shaft 282 by which it is rotated. The outer end 281ª of the vane 281 is in close contact with the interior surface of the cylindrical section 279, the said surface being coated with a suitable lubricating material to provide an air-tight contact. A second vane 284 is swingably mounted in the extension 280 and is constantly pressed by a spring 285 against the vane 281, or when the latter is out of reach, against the rounded rear side, so that the air, which enters at 286, is compressed by the vane rotating in the direction of the arrow (Figure 8) toward the outlet 287 and into the pipe 288 which is connected to the compressed air tank. A self-closing valve is arranged in pipe 288 which prevents black-flow of air into the interior 279ᵇ of the pump.

When the vane 281 is rotated from the position of Figure 8 in the direction of the arrow, the vane 284 is pressed against the rounded rear side of the vane 281 and thus prevents escape of air from the space 279ᵇ into the interior of the extension 280. When the forward edge 281ᵇ of the vane 281 reaches the vane 284, the former glides along the vane 284 and pushes the latter against the action of spring 285 to the position shown in dotted lines in Figure 8. When the edge 281ᵇ passes beyond the vane 284, the latter glides back under the action of its spring along the rear side 281ᶜ of the vane 281 to the position shown in full lines in Figure 8. The vanes 281 and 284 may be composed of somewhat flexible rubber, or may be composed of a rigid material coated with rubber, and may be coated with a suitable lubricant to insure air-tight contacts.

Upon the drive shaft 282 of the pump there is fixed a ratchet wheel 291 engaged by a pawl 290, so that the shaft can be driven only in the direction of revolution of the vane 281. The shaft is driven by a pulley 294 which is driven from an axle or similar element by an endless belt. The shaft 282 is provided with a short thread 295 adjacent which is located a fixed abutment 293. The bore 296 of the pulley is provided with a correspondingly threaded portion which, on rotation of the pulley in the direction of revolution of the pump, screws onto the thread 295, so that when the side face 297 of the pulley engages the side face 298 of the abutment 293 the shaft 282 will be driven by the pulley. To the left of the thread 295 is an unthreaded portion 299 which is joined to a section 300 of shaft 282 of greater diameter. If the pulley is rotated in the opposite direction, it automatically becomes unscrewed from the thread 295 and is pressed toward the left. The pulley then runs loosely upon the shaft 282, the threaded section loosely engaging the portion 299 of the shaft and the wall of the bore 296 sliding upon section 300 of the shaft. There is thus produced a one-way clutch which operates to drive pump in only one direction, the clutch automatically disconnecting the pump from the driving shaft when the latter rotates in the opposite direction.

I claim:

1. In a braking system for vehicles, the combination with one or more braking elements and electrically operated means for regulating the braking effect of said braking elements, of a cylinder, a piston movable in said cylinder and operatively associated with said elements, an air-pump, a driving connection between the latter and a rotating part of said vehicle, and a conduit for charging compressed air to the cylinder whereby said piston is moved to hold said elements in inoperative position, said driving connection including a one-way clutch operating automatically to connect said pump with the rotating part of the vehicle when the latter rotates in the direction of rotation of the pump and operating automatically to disconnect the same when said rotating part rotates in the opposite direction.

2. In a braking system for vehicles, the combination with one or more braking elements and electrically operated means for regulating the braking effect of said braking elements, of a cylinder, a piston movable in said cylinder and operatively associated with said elements, an air-pump, a driving connection between the latter and a rotating part of said vehicle, a conduit for charging compressed air to the cylinder whereby said piston is moved to hold said elements in inoperative position, said driving connection including a shaft forming part of said pump, a driven pulley loosely mounted on said shaft, a short thread on said shaft, a correspondingly short thread in the bore of said pulley adapted to engage said first-mentioned thread, and an abutment on said shaft engageable by said pulley, whereby upon rotation of the pulley in the direction of rotation of the pump said pulley will become screwed onto said shaft and will engage said abutment to operate said pump and upon rotation of said pulley in the opposite direction the latter will become uncoupled from said pump.

3. In a braking system for vehicles, the combination with one or more braking elements and electrically operated means for regulating the braking effect of said braking elements, of a cylinder, a piston movable in said cylinder and operatively associated with said elements, a conduit for charging compressed air to the cylinder whereby said piston is moved to hold said elements in inoperative position, and a switch device for controlling the flow of air through said conduit and also the circuit of said electrically operated means, whereby in the position of said switch device corresponding to the inoperative position of said braking elements said circuit is broken while the flow of air through said conduit to the cylinder is permitted.

4. In a braking system for vehicles, the combination with one or more braking elements and electrically operated means for regulating the braking effect of said braking elements, of a cylinder, a piston movable in said cylinder and operatively associated with said elements, a conduit for charging compressed air to the cylinder whereby said piston is moved to hold said elements in inoperative position, a valve for controlling the flow of air through said conduit, an electrically operated device for controlling said valve, and a switch device for controlling the circuit of said electrically operated device and also the circuit of said electrically operated means, whereby in the position of said switch device corresponding to the inoperative position of said braking elements said second-mentioned circuit is broken while said first-mentioned circuit is established to open said valve to charge air into said cylinder.

5. An electropneumatic braking system for vehicles comprising one or more braking elements, a spring associated with said elements and operating to urge the same into braking position, electromagnetically operated controlling mechanism operatively associated with said spring to overcome partially or entirely the action thereof, and pneumatically operated mechanism associated with said elements to hold the same in released position.

6. An electropneumatic braking system for vehicles comprising one or more braking elements, a spring associated with said elements and operating to urge the same into braking position, electromagnetically operated controlling mechanism operatively associated with said spring to overcome partially or entirely the action thereof, pneumatically operated mechanism associated with said elements to hold the same in released position, and means for rendering said last-mentioned mechanism operative upon release of said braking elements and substantially simultaneously de-energizing said electromagnetically operated mechanism.

7. An electropneumatic braking system for vehicles comprising one or more braking elements, a spring associated with said elements and operating to urge the same into braking position, electromagnetically operated controlling mechanism operatively associated with said spring to overcome partially or entirely the action thereof, pneumatically operated mechanism associated with said elements to hold the same in released position, means for rendering said last-mentioned mechanism operative upon release of said braking elements and substantially simultaneously de-energizing said electromagnetically operated mechanism, said pneumatically operated mechanism comprising a cylinder, a piston movable therein, a connection between said piston and said braking elements, and a conduit controlled by said means for charging compressed air to said cylinder.

8. An electropneumatic braking system for vehicles comprising one or more braking elements, a spring associated with said elements and operating to urge the same into braking position, electromagnetically operated controlling mechanism operatively associated with said spring to overcome partially or entirely the action thereof, pneumatically operated mechanism associated with said elements to hold the same in retracted position, means for rendering said last-mentioned mechanism operative upon release of said braking elements and substantially simultaneously de-energizing said electromagnetically operated mechanism, said pneumatically operated mechanism comprising a cylinder, a piston movable therein, a connection between said piston and said braking elements, a conduit controlled by said means for charging compressed air to said cylinder, an air-pump, and a driving connection between said air-pump and a moving part of the vehicle, said conduit receiving air from said pump.

9. An electropneumatic braking system for vehicles comprising one or more braking elements, a spring associated with said elements and operating to urge the same into braking position, electromagnetically operated controlling mechanism operatively associated with said spring to overcome partially or entirely the action thereof, pneumatically operated mechanism associated with said elements to hold the same in released position, means for rendering said last-mentioned mechanism operative upon release of said braking elements and substantially simultaneously de-energizing said electromagnetically operated mechanism, said pneumatically operated mechanism comprising a cylinder, a piston movable therein, a connection between said piston and said braking elements, a conduit controlled by said means for charging compressed air to said cylinder, an air-pump, and a driving connection between said air-pump and a moving part of the vehicle, said conduit receiving air from said pump, said driving connection including a one-way clutch whereby the pump is driven only during the forward travel of the vehicle.

In testimony whereof I have affixed my signature.

HEINRICH KARL.